(12) United States Patent
Hine

(10) Patent No.: US 8,203,786 B2
(45) Date of Patent: Jun. 19, 2012

(54) METHOD AND SYSTEM FOR SCREEN ATTACHMENT

(75) Inventor: Matthew G. Hine, Plano, TX (US)

(73) Assignee: Texas Instruments Incorporated, Dallas, TX (US)

( * ) Notice: Subject to any disclaimer, the term of this patent is extended or adjusted under 35 U.S.C. 154(b) by 911 days.

(21) Appl. No.: 11/648,345

(22) Filed: Dec. 28, 2006

(65) Prior Publication Data

US 2008/0158796 A1    Jul. 3, 2008

(51) Int. Cl.
*G03B 21/60*    (2006.01)
(52) U.S. Cl. ........ 359/457; 359/453; 359/455; 359/456; 349/58
(58) Field of Classification Search .................... 349/58; 348/787, 789, 794; 353/119; 359/453, 455–457
See application file for complete search history.

(56) References Cited

U.S. PATENT DOCUMENTS

| | | | |
|---|---|---|---|
| 6,218,679 B1* | 4/2001 | Takahara et al. | 257/59 |
| 6,614,594 B2* | 9/2003 | Murasugi et al. | 359/450 |
| 6,848,793 B2* | 2/2005 | Utsumi | 353/74 |
| 6,866,389 B2* | 3/2005 | Ito et al. | 353/119 |
| 7,531,952 B2* | 5/2009 | Kawanami et al. | 313/466 |
| 2002/0044234 A1* | 4/2002 | Choi | 349/65 |
| 2003/0156264 A1* | 8/2003 | Honda | 353/74 |
| 2004/0223090 A1* | 11/2004 | Takahashi et al. | 349/38 |
| 2005/0259322 A1* | 11/2005 | Boecker et al. | 359/460 |
| 2006/0189097 A1* | 8/2006 | Maruyama et al. | 438/458 |
| 2007/0040816 A1* | 2/2007 | Toyomaki | 345/174 |
| 2007/0097501 A1* | 5/2007 | Stern et al. | 359/453 |

OTHER PUBLICATIONS

"VHB Tapes Bond Muntins to Glass in Window and Door Assembly", Aug. 2006, 2 pages, 3M Technical Bulletin No. 70-0704-8689-2.
"3M VHB Durability", Mar. 2001, 6 pages, 3M Technical Bulletin No. 70-0709-3862-9.
"VHB Tapes", 2003, 3M Technical Bulletin No. 70-0709-3961-9.

* cited by examiner

*Primary Examiner* — Nathanael R Briggs
(74) *Attorney, Agent, or Firm* — Warren L. Franz; Wade J. Brady, III; Frederick J. Telecky, Jr.

(57) ABSTRACT

Methods and apparatus for a display system include a frame and one or more screen panels. Each panel has an inwardly disposed face and an outwardly disposed face. An adhesive layer couples to respective portions of each inwardly disposed face. At least one of the adhesive layers couples the one or more screen panels to the frame.

11 Claims, 2 Drawing Sheets

US 8,203,786 B2

METHOD AND SYSTEM FOR SCREEN ATTACHMENT

TECHNICAL FIELD

This invention relates in general to display systems and, in particular, to display systems having an enhanced screen attachment.

OVERVIEW

Television display systems typically include a wide bezel disposed in front of the viewing screen to facilitate mechanical fastening of the screen. This visible bezel, usually made of plastic or metal, is often unattractive to viewers. Minimizing or eliminating the visible bezel without compromising reliability is difficult for a variety of reasons.

SUMMARY OF THE EXAMPLE EMBODIMENTS

In one embodiment, an apparatus for a display system includes a frame and one or more screen panels. Each panel has an inwardly disposed face and an outwardly disposed face. An adhesive layer couples to respective portions of each inwardly disposed face. At least one of the adhesive layers couples the one or more screen panels to the frame.

In a method embodiment, a method of displaying an image includes providing one or more screen panels of a display system. Each screen panel has an inward face and an outward face. The outward face is opposite the inward face and disposed closest to a viewing side of the display system. The method further includes coupling an adhesive layer to respective at least a portion of each of each inward face of one or more screen panels. At least one adhesive layer couples the one or more screen panels to a frame.

In described example embodiments, a rear projection display system has a chassis housing projection components of the display system. The chassis includes a frame with a hidden bezel that defines an opening, and Fresnel and lenticular layer panels bonded at marginal edge portions with double-sided adhesive tape to couple the panels securely over the opening so that no part of the frame or chassis extends over the outward surface of either panel. The Fresnel layer panel has properties for enabling a wider viewing angle. The lenticular layer panel has properties for steering incident light beams in a direction normal to the Fresnel layer panel. The lenticular layer panel is bonded at a marginal edge portion of an inward surface to an outwardly facing portion of the frame by the tape, which may be a conformable, double-sided, pressure sensitive, closed-cell acrylic foam adhesive tape. In one described embodiment, a marginal edge portion of an inward surface of the Fresnel layer panel is bonded to a corresponding marginal edge portion of an outward surface of the lenticular layer panel. In another described embodiment, the lenticular layer panel is bonded to an outwardly facing first portion of the bezel and the Fresnel layer panel is bonded to an outwardly facing second portion of the bezel. In one implementation, the bezel has a stepped configuration with an inner step to which the lenticular layer is bonded, and an outer step to which the Fresnel layer is bonded, the inner step being recessed more inwardly and being closer to a center of the opening than the outer step. The Fresnel and lenticular layer panels are bonded to the frame over the opening with no part of the frame or chassis extending over the outward surface of either layer panel. The bonding secures the Fresnel and lenticular layer panels over the opening with the double-sided tape and without any application of other mechanical force to the outward surface of the Fresnel layer panel.

Technical advantages of some embodiments of the disclosure may include a display system having an enhanced screen panel attachment with little or no visible bezel. Some embodiments may reduce material and production costs compared to conventional mechanical attachment methods.

It will be understood that the various embodiments of the disclosure may include some, all, or none of the enumerated technical advantages. In addition other technical advantages of the disclosure may be readily apparent to one skilled in the art from the figures, description, and claims included herein.

BRIEF DESCRIPTION OF THE DRAWINGS

For a more complete understanding of the disclosure and features and advantages thereof, reference is now made to the following description, taken in conjunction with the accompanying drawings, in which.

DESCRIPTION OF EXAMPLE EMBODIMENTS

Figure 2:
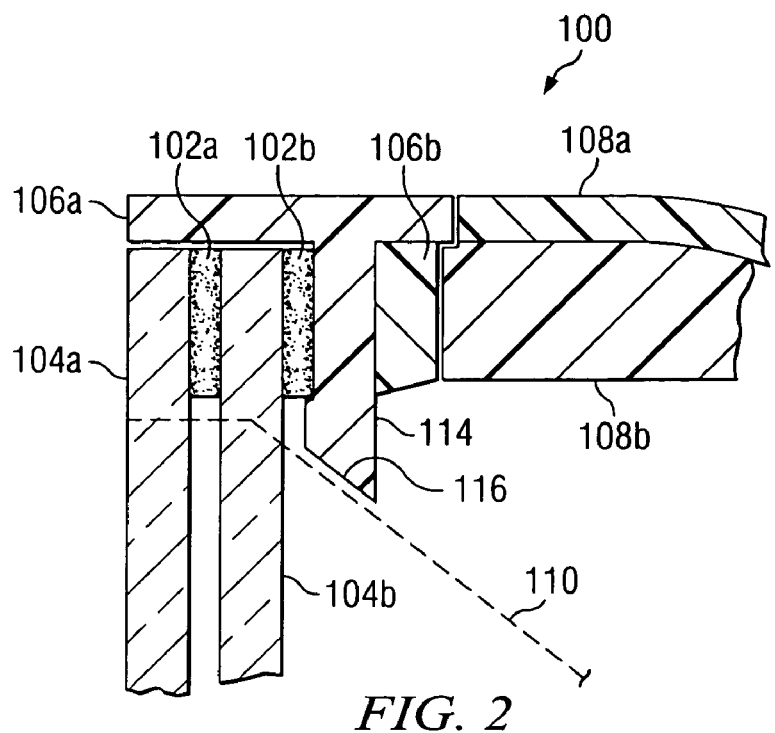
FIG. 2 is a cross-sectional view illustrating one embodiment of a portion of the display system of FIG. 1 having a bonded pair of screen panels adhered to a frame.
Figure 3:
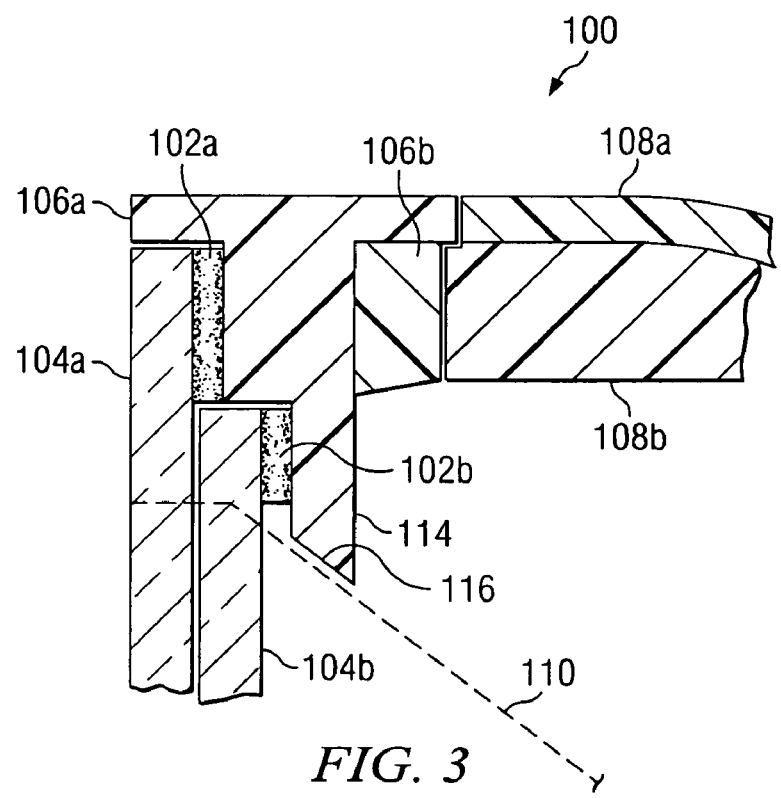
FIG. 3 is a cross-sectional view illustrating one embodiment of a portion of the display system of FIG. 1 having two screen panels, each respectively adhered to a frame.

In accordance with the teachings of the disclosure, a screen attachment system and method for the same are provided. By coupling screen panels to a frame using adhesive layers, particular embodiments of the present disclosure may minimize or even eliminate the frame bezel, thereby enhancing aesthetics of a visual display system. Particular examples and dimensions specified throughout this document are intended for example purposes only, and are not intended to limit the scope of the present disclosure. In particular, this document is not intended to be limited to a particular visible display, such as, a rear projection television. Moreover, the illustrations in FIGS. 1 through 3 are not necessarily drawn to scale.

Figure 1:
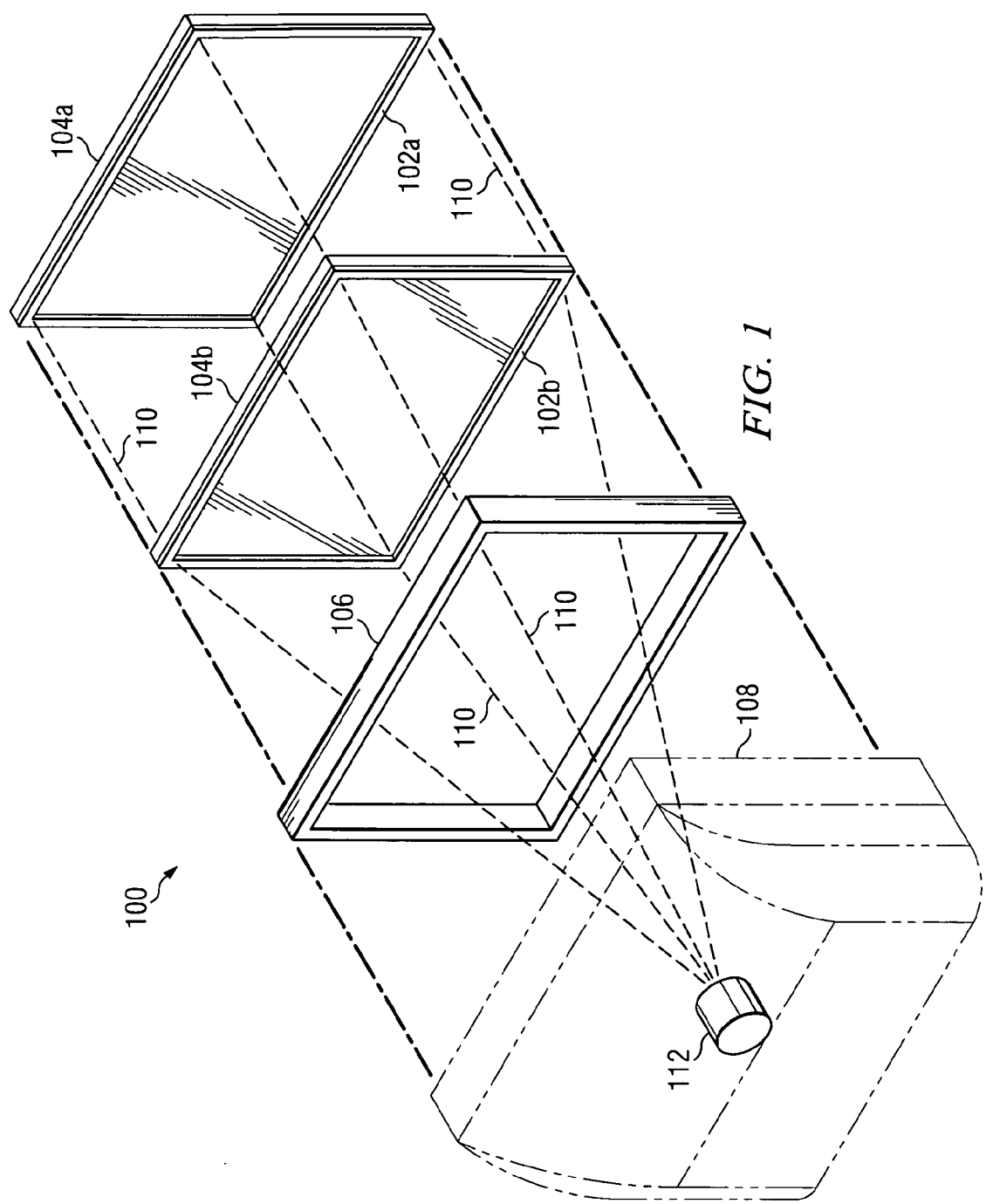
FIG. 1 is an exploded block diagram of a portion of a display system in accordance with a particular embodiment of the present disclosure.

FIG. 1 is an exploded block diagram of a portion of a display system 100 in accordance with a particular embodiment of the present disclosure. As shown in FIG. 1, display system 100 generally includes a plurality of adhesive layers 102 coupling respective screen panels 104 to a frame 106. The frame 106 couples screen panels 104 to a chassis 108. Display system 100 is generally capable of producing a visible display by directing light source beams (e.g., light beam 110 from light source 112) toward screen panels 106.

Adhesive layers 102 generally refer to any adhesive fastener operable to couple screen panels 104 together and/or couple screen panels 104 to frame 106. In various embodiments, adhesive layers 102 may include, for example, tape, epoxy, and/or sonic welds. In this particular embodiment, adhesive layers 102a and 102b are double-sided tape having acrylic adhesive on both sides of conformable foam. The foam may be viscoelastic in nature to provide tape 102 with energy absorbing and stress relaxing properties.

In various embodiments, such foam may enhance bond strength between screen panels 104a, 104b, and frames 106 made of material that may have differing coefficients of thermal expansion. The acrylic adhesive on each side of the double-sided tape 102a and 102b may be selected to optimally adhere to the respective surfaces of screen panels 104a, 104*b*, or frame 106. Tape 102 that offers sealing properties and durable performance may further enhance display system 100 reliability. Some embodiments may utilize tape 102 having a dark or black appearance to enhance the aesthetics of display system 100. In various embodiments, tape 102 such as 3M™VHB™4941 and 5952 double-sided, pressure sensitive, closed-cell acrylic foam adhesive tapes that are approximately 0.045 inches thick and 0.25 inches wide may be configured to adequately exhibit the above properties; however, other appropriate dimensions or products may be used. For example, various other embodiments may use tape with a higher bond strength that facilitates the use of narrower dimensions.

Various other embodiments may alternatively use an epoxy for adhesive layers 102, such as, for example, glue or ultraviolet-cured epoxy. In such embodiments, the bond strength of various epoxies may facilitate an adhesive layer narrower than 0.25 inches. However, some epoxy adhesive layers 102 may not exhibit the same thermal-stress relaxing properties as the tape adhesive layers 102 previously described. In addition, the edges of some epoxy adhesive layers 102 may not be as aesthetically uniform as the tape adhesive layers 102 previously described. As shown in the example embodiment of FIG. 1, adhesive layers 102*a* and 102*b* are disposed along the edge of the inward surfaces of screen panels 104*a* and 104*b* respectively.

Screen panels 104 generally refer to any layer or surface for displaying or projecting light, such as, for example, transparent acrylic, polycarbonate plastic, and/or glass. In this particular embodiment, screen panels 104 include a lenticular layer 104*a* and a Fresnel layer 104*b*. As explained further below, Fresnel layer 104*b* steers incident light beams in a direction normal to lenticular layer 104*a*. Lenticular layer 104*a* has properties that enable a wider viewing angle for display system 100.

Frame 106 generally refers to any structure operable to couple screen panels 104 to chassis 108. Although FIG. 1 illustrates frame 106 and chassis 108 as distinct pieces, in various other embodiments frame 106 may be a solid extension of chassis 108. In the example embodiment, frame 106 is formed from polycarbonate or acrylonitrile-butadiene-styrene(ABS); however, any suitable material may be used. Chassis 108 generally refers to any casing operable to house the remainder of components for display system 100, including light source 112 and associated optics (not explicitly shown).

Conventional television display systems typically include a wide bezel disposed in front of the viewing screen to facilitate a strong mechanical holding. The bezel, usually made of plastic or metal, is often unattractive to viewers. Accordingly, some particular embodiments of the present disclosure recognize that coupling screen panels 104 to various frame 106 designs using adhesive layers 102 may minimize or even eliminate the front bezel of frame 106, thereby enhancing aesthetics of a visual display system. Display system designs associated with these generalized example embodiments are further illustrated in FIGS. 2 and 3.

FIG. 2 is a cross-sectional view illustrating one embodiment of a portion of the display system 100 of FIG. 1 having a bonded pair of screen panels 104*a* and 104*b* adhered to a frame 106. As illustrated in FIG. 2, adhesive layer 102*a* couples together screen panels 104*a* and 104*b* by bonding the inward surface of screen panel 104*a* to the outward surface of screen panel 104*b*. Adhesive layer 102*b* couples the paired screen panels 104 to frame 106 by bonding the inward surface of screen panel 104*b* to a hidden bezel 114 of frame 106.

In this particular embodiment, a beveled edge 116 of hidden bezel 114 allows high-angle light beams 110 to illuminate screen panels 104, including a lenticular layer 104*a* and a Fresnel layer 104*b*. Fresnel layer 104*b* steers incident light beams (e.g., light beams 110) in a direction normal to lenticular layer 104*a*. As illustrated in FIG. 2, high-angle light beams 110 pass through Fresnel layer 104*b* approximately 0.28 inches from the inner edge of the frame 106 sidewall, in the illustrated embodiment.

In various embodiments, frame 106 and chassis 108 may each respectively include multiple pieces coupled together. For example, in this particular embodiment, frame 106 includes a first portion 106*a* that covers the sides of screen panels 104 and facilitates screen panel 104 attachment. In addition, frame 106 includes a second portion 106*b* that facilitates the attachment of frame 106 to a second portion 108*b* of chassis 108. A first portion 108*a* of chassis 108*b* forms an outer shell around chassis 108. As illustrated in FIG. 2, first and second portions 106*a* and 106*b* of frame 106 and first and second portions 108*a* and 108*b* of chassis 108 may be distinct pieces of display system 100 that are coupled together. However, the form and structure of frame 106 and chassis 108 may be effected by any of a variety of designs. For example, in various other embodiments first and second portions 106*a* and 106*b* of frame 106 may be one solid piece and first and second portions 108*a* and 108*b* of chassis 108 may be another solid piece.

In various embodiments, the gaps between screen panels 104*a* and 104*b*, frame 106, and chassis 108 may relieve stress associated with thermal expansion. In some embodiments, these gaps may be minimized by selecting materials having coefficients of thermal expansion that are more closely matched.

The width of adhesive layers 102*a* and 102*b* may be narrower in various other embodiments. For example, other embodiments may use stronger adhesives. In such embodiments, hidden bezel 114 of frame 106 may be shorter, thereby enabling increased illumination along the edges of screen panels 104. However, in some embodiments, a greater bond is achievable between screen panels 104 and frame 106 than between screen panel 104*a* and screen panel 104*b*. Various display system 100 designs may accommodate the adhering of each screen panel 104*a* and 104*b* to frame 106. An example embodiment is illustrated in FIG. 3.

FIG. 3 is a cross-sectional view illustrating another embodiment of a portion of the display system 100 of FIG. 1 having two screen panels 104*a* and 104*b*, each respectively adhered to a frame 106. As shown in FIG. 3, frame 106 includes a stair-stepped hidden bezel 114. Each step of hidden bezel 114 provides a bonding surface for a respective screen panel 104*a* and 104*b*.

In this particular embodiment, a beveled edge 116 of hidden bezel 114 allows high-angle light beams 110 to illuminate screen panels 104, including a lenticular layer 104a and a Fresnel layer 104*b*. Fresnel layer 104*b* steers incident light beams (e.g., light beams 110) in a direction normal to lenticular layer 104*a*. As illustrated in FIG. 3, high-angle light beams 110 pass through Fresnel layer 104*b* approximately 0.5 inches from the inner edge of the frame 106 sidewall.

Although the example embodiments illustrated in FIGS. 2 and 3 do not include a bezel disposed outwardly from the screen, other embodiments may alternatively include such a visible bezel without departing from the scope of the present disclosure.

Although the disclosure has been described in several embodiments, a myriad of changes, variations, alterations, transformations, and modifications may be suggested to one skilled in the art, and it is intended that the present disclosure encompass such changes, variations, alterations, transformations, and modifications as falling within the spirit and scope of the appended claims.

What is claimed is:

1. A method for coupling screen panels over an opening of a chassis housing components of a rear projection display system, the method comprising:
   providing a lenticular layer panel having properties for enabling a wider viewing angle;
   providing a Fresnel layer panel having properties for steering incident light beams in a direction normal to the lenticular layer panel;
   bonding a marginal edge portion of an inward surface of the Fresnel layer panel to an outwardly facing first portion of a hidden bezel of a frame of the chassis defining the opening, using double-sided adhesive tape; and
   bonding a marginal edge portion of an inward surface of the lenticular layer panel to one of: a) a corresponding marginal edge portion of an outward surface of the Fresnel layer panel, or b) to an outwardly facing second portion of the hidden bezel, using double-sided adhesive tape;
   wherein the bonding secures the Fresnel and lenticular layer panels over the opening with no part of the frame or chassis extending over the outward surface of either panel.

2. The method of claim 1, wherein the double-sided adhesive tape is a tape having adhesive on both sides of conformable foam.

3. The method of claim 2, wherein the tape has a dark or black appearance.

4. The method of claim 2, wherein the tape is a conformable, double-sided, pressure sensitive, closed-cell acrylic foam adhesive tape.

5. The method of claim 4, wherein the marginal edge portion of the inward surface of the lenticular layer panel is bonded to the corresponding marginal edge portion of the outward surface of the Fresnel layer panel.

6. The method of claim 4, wherein the marginal edge portion of the inward surface of the lenticular layer panel is bonded to the outwardly facing second portion of the hidden bezel; and wherein the hidden bezel has a stepped configuration with an inner step defining the first portion and an outer step defining the second portion, the inner step being recessed more inwardly and being closer to a center of the opening than the outer step.

7. The method of claim 1, wherein the bonding secures the Fresnel and lenticular layer panels over the opening without application of any mechanical force to the outward surface of the lenticular layer panel.

8. A method for coupling screen panels over an opening of a chassis housing components of a rear projection display system, the method comprising:
   providing a lenticular layer panel having properties for enabling a wider viewing angle;
   providing a Fresnel layer panel having properties for steering incident light beams in a direction normal to the lenticular layer panel;
   bonding a marginal edge portion of an inward surface of the Fresnel layer panel to an outwardly facing inner stepped portion of a hidden bezel of a frame of the chassis that defines the opening, using a conformable, double-sided, pressure sensitive, closed-cell acrylic foam adhesive tape; and
   bonding a marginal edge portion of an inward surface of the lenticular layer panel to an outwardly facing outer stepped portion of the hidden bezel, using the double-sided adhesive tape, the inner stepped portion being recessed more inwardly and being closer to a center of the opening than the outer stepped portion;
   wherein the bonding secures the Fresnel and lenticular layer panels over the opening with no part of the frame or chassis extending over the outward surface of either panel.

9. The method of claim 8, wherein the bonding secures the Fresnel and lenticular layer panels over the opening without application of any mechanical force to the outward surface of either panel.

10. A rear projection display system, comprising:
    a chassis housing projection components of the display system, the chassis including a frame with a hidden bezel that defines an opening, the bezel including outwardly facing inner and outer stepped portions with the inner stepped portion being recessed more inwardly and being closer to a center of the opening than the outer stepped portion;
    a Fresnel layer panel bonded at a marginal edge portion of an inward surface to the inner stepped portion by conformable, double-sided, pressure sensitive, closed-cell acrylic foam adhesive tape; and
    a lenticular layer panel bonded at a marginal edge portion of an inward surface to the outer stepped portion by conformable, double-sided, pressure sensitive, closed-cell acrylic foam adhesive tape;
    the lenticular layer panel having properties for enabling a wider viewing angle, the Fresnel layer panel having properties for steering incident light beams in a direction normal to the lenticular layer panel, and the Fresnel and lenticular layer panels being bonded to the frame over the opening with no part of the frame or chassis extending over the outward surface of either panel.

11. The system of claim 10, wherein the Fresnel and lenticular layer panels are bonded to the frame without application of any mechanical force to the outward surface of either panel.

* * * * *